United States Patent Office 3,388,968
Patented June 18, 1968

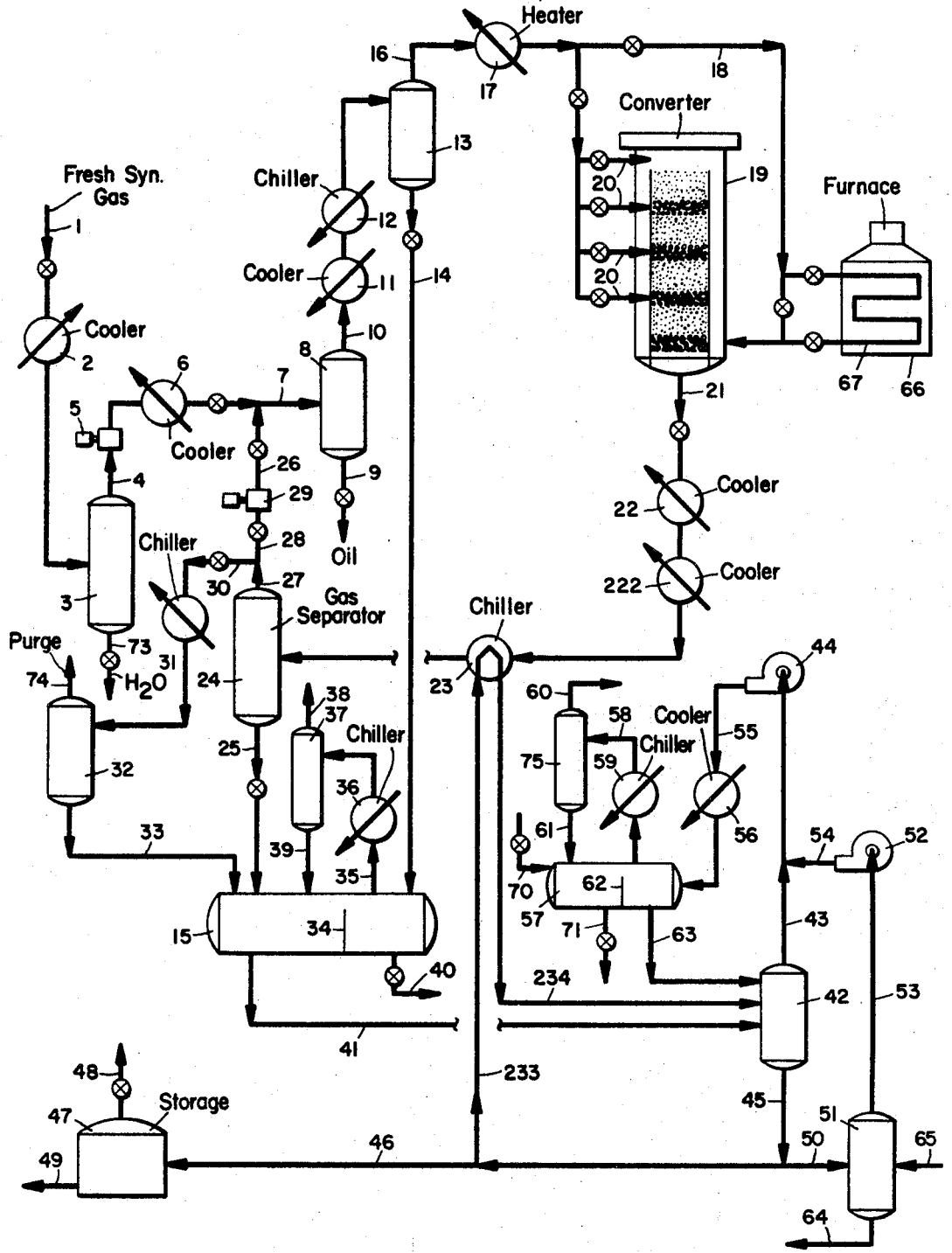

3,388,968
AMMONIA SYNTHESIS FEED AND
RECYCLE LOOP
Maurice Spielman, New Providence, and George P. Baumann, Sparta, N.J., and Burton Hering, Bronx, N.Y., assignors to Esso Research and Engineering Company, a corporation of Delaware
Filed Dec. 1, 1965, Ser. No. 510,848
4 Claims. (Cl. 23—199)

ABSTRACT OF THE DISCLOSURE

An improved continuous process for the synthesis of ammonia from synthesis gas wherein a mixed feed of fresh ammonia synthesis gas and of recycle synthesis gas which remains unconverted is transported to an ammonia synthesis conversion zone, which comprises condensing 70 to 85% of the ammonia synthesized as high refrigeration grade ammonia, mixing the remaining portion of the recycle gas containing uncondensed ammonia with fresh synthesis gas in a ratio of from 3/1 to 3.5/1, and condensing out fertilizer grade ammonia with catalyst poisons including water, carbon oxides, and hydrocarbon oil.

---

This invention is concerned with means and processing operations used in preparing for ammonia synthesis a mixed gas feed stream from a hydrocarbon reforming process and recycle gas separated under high pressure from ammonia product which is used for refrigeration. Means and steps for joint recovery of ammonia from an associated urea synthesis plant may be provided, also.

A distinctive improvement by the present invention results from close control of the amounts of inert gas and ammonia in the mixed gas feed for reliable operation in all the steps involved, including separations of ammonia and inert gases from the recycle gas, proportioning of recycle gas to fresh or make-up synthesis gas, and removal of ammonia with catalyst poisons from the mixed gas feed before conversion.

The loop circuit transports a feed gas mixture of fresh synthesis gas or make-up gas mixed with recycle gas to a conversion zone from a gas mixing zone and returns a recycle gas stream separated from ammonia and inert gases present in the conversion zone effluent back to the mixing zone.

There are several important variables to be controlled for close control of the amounts of inert gas and ammonia in the mixed gas feed transported to the conversion zone. The control of these variables in any part of the circuit is dependent on the control of the variables in the other parts.

The pressure in the conversion zone is set as a primary factor with respect to the extent of conversion at the highest suitable reaction temperature allowable considering the activity of the catalyst and the nature of the feed gas.

Having set the pressure in the conversion zone, this pressure is transmitted in the effluent gas product from the conversion zone to a subsequent zone where the effluent is chilled for condensing out ammonia in a certain proportion so as to leave the remaining unreacted and uncondensed gas suitable as recycle gas that contains uncondensed ammonia and the inert gases, e.g., methane, argon, and probably helium.

The recycle gas stream is maintained under high pressure in order to minimize the amount of compression required before the recycle gas is mixed with make-up gas.

Before the recycle gas stream is mixed with make-up gas a certain proportion of the recycle gas is separated as a bleed stream for purging the inert gases so as to avoid excessive accumulation of the inert gases in the loop circuit. In separating the bled stream for purging, there has to be taken into consideration losses of $N_2$, $H_2$, and $NH_3$ present in the purge gas. In addition, there must be taken into consideration the ratio of the compressed recycle gas to the make-up gas for obtaining a mixture having a relied upon amount of inerts and an adequate ammonia content for the subsequent ammonia condensation which accomplishes removal of impurities including water, carbon oxides, and any remaining hydrocarbon oil.

The variations of pressure through the loop from the pressure in the conversion zone is mainly a matter of pressure drop. Considering that the desired conversion pressure is 4300 to 4400 p.s.i.g., the pressure in the mixing zone where recycle gas is mixed with make-up gas, at what may be called the beginning of the circuit, should be above the conversion pressure and in the range of 4300 to 5000 p.s.i.g. The lowest pressure in this circuit loop where the effluent gas from the conversion zone is chilled to condense out most of the ammonia is below the conversion pressure, e.g., between 4000 and 4400 p.s.i.g. The amount of ammonia condensed out from the conversion zone effluent gas under a pressure above 4000 p.s.i.g. then depends on the associated chilling temperature, and the amount of chilling has a relationship to the amount of refrigeration available.

Next, the recycle gas has to have a bleed stream removed for purging certain amounts of the inert gases without upsetting the proportion of recycle gas remaining to be mixed with fresh synthesis gas or make-up gas at the gas mixing or starting point of the circuit. With the operating pressures determined to be in the range of 4000 to 5000 p.s.i.g. through the circuit described, the proper ratio of recycle gas to be mixed with the make-up gas is in the range of 3/1 to 3.5/1. This mixing ratio then permits the resulting mixed feed gas to have a certain composition with regard to inert gas components and ammonia with hydrogen and nitrogen present in the ratio of 3 moles of $H_2$ per mole of $N_2$ both before this mixed feed gas is chilled to remove the necessary amount of ammonia condensate that washes out catalyst poisons and after removal of such condensate with the poisons.

After removal of the ammonia condensate which washes out the catalyst poisons, the mixed feed gas should have a suitable composition for controlling the exothermic reaction in the presence of a catalyst at suitable reaction temperatures in the range of 800° to 1000° F. and pressures within the range of 4000 to 5000 p.s.i.g. Under these reaction conditions the amount of conversion becomes stabilized with the feed containing the correct amount of inert gas and ammonia together with the hydrogen and nitrogen if provision is made for proper removal of heat from the reaction zone, e.g., through heat exchange with the feed gas and quenching by introducing relatively cold feed gas above the first catalyst bed and between the catalyst beds.

In the recovery of ammonia, part of the ammonia of higher purity is advantageously segregated for use as a refrigerant that is circulated in a refrigerating system without excessive build up of impurities.

The present invention includes innovations particularly useful in combination with advanced methods for preparing ammonia synthesis gas and for processing the synthesis gas to obtain a refrigeration grade ammonia and a fertilizer grade ammonia suitable for urea preparation.

In a preferred embodiment of this invention, there is provided, in a continuous ammonia synthesis process wherein a mixed feed of fresh ammonia synthesis gas and ammonia containing recycle synthesis gas which contains unconverted hydrogen and nitrogen therein is transported to an ammonia synthesis conversion zone, an improvement which comprises condensing 15 to 30% of the total ammonia synthesized to remove the catalyst poisoning impurities comprising water, carbon oxides, and hydrocarbon oil from the mixed feed thereby leaving about 2 to about 4% ammonia in the feed; effecting the ammonia synthesis reaction in a conversion zone under a pressure of between about 4000 and about 5000 p.s.i.g.; condensing the remaining 70 to 85% of the synthesized ammonia for use as a refrigerant in a refrigeration cycle; separating from the recycle gas a purge stream for controlling inert material comprising methane, argon, and helium at a level of 10 to 15%; and compressing the remaining recycle gas and mixing it with said fresh synthesis gas in a ratio of between about 3/1 to about 3.5/1 to form a mixed feed containing hydrogen and nitrogen in a ratio of from about 3 moles of hydrogen to about 1 mole of nitrogen.

To make a high-pressure ammonia synthesis gas, hydrocarbons, e.g., as present in natural gas or light naphtha, are mainly steam-reformed in a primary reformer at 350 to 500 p.s.i.g., then air and steam reformed at a higher temperature in a secondary reformer, the air being supplied preheated and in an amount to give the final gas product a ratio of 3 moles of $H_2$ per 1 mole of $N_2$. The effluent gases from the secondary reformer are passed through high- and low-temperature shift conversion zones to react CO with $H_2O$ so as to form $CO_2$ and $H_2$, and the low-temperature catalytic shift conversion is controlled to prevent condensation of aqueous liquid at temperatures in the range of 400 to 500° F. by keeping the partial pressure of water vapor in the gas sufficiently low, e.g., 150 to 200 p.s.i. The $CO_2$ is removed by any of the suitable absorption methods, e.g., with hot potassium carbonate solution, and a $CO_2$ gas stream under 2 to 4 atms. pressure of suitable purity for use in urea synthesis is thus obtained. The scrubbed gas of $3H_2/N_2$ components is further purified by catalytic methanation, reaction of carbon oxide impurities with $H_2$ forming $CH_4$ and then contains less than 2% inerts ($CH_4$, A, He).

In this and the following description of the process the percentages of gas components and products are given in volume percent or mole percent.

The purified synthesis gas containing $3H_2/N_2$ with only small amounts of inert gases and water with traces of CO and $CO_2$ is under pressure and ready for compression desired for the synthesis reaction:

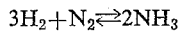

$$3H_2 + N_2 \rightleftarrows 2NH_3$$

For the synthesis reaction various kinds of converters can be used. A preferred kind of converter has an inner chamber holding catalyst bed sections or baskets. The catalyst chamber is contained in an inner cylindrical metal shell, which is within an outer pressure shell, forming an annular space therebetween for allowing cold feed gas to flow through the annular space and thereafter through the catalyst beds for maintaining temperature control and heating the feed gas. Cold feed gas is injected at the inlet to the first bed and between the beds of catalyst for additional cooling.

In another suitable converter construction the main feed gas stream is made to flow down through the annular space, through an internal heat exchanger, up through a central pipe, then down through the beds of catalyst.

The ammonia synthesis catalyst activated by reduction is generally composed of pyrophoric iron particles with small proportions of promoters, e.g., $K_2O$ and $Al_2O_3$, and this catalytic material has to be prevented from sintering or becoming deactivated by overheating. The synthesis reaction is exothermic. The catalyst is also susceptible to poisoning by oxygen compounds (CO, $CO_2$ and $H_2O$ vapor) and by other substances such as halogen compounds, S, and hydrocarbon oil. Accordingly, a great deal of care is necessary in controlling the temperature, pressure, and composition of the converter feed gas prepared from the fresh feed and the recycle gas.

To describe the principles of operation in more detail, reference is made to the accompanying drawing which shows a schematic flow plan of the process steps and of required means.

Referring to the drawing, fresh feed gas obtained by reforming hydrocarbons is obtained from the final purification, e.g., catalytic methanation, under a pressure of 350 to 450 p.s.i.g. through line 1 and is passed through a heat exchange cooler 2 to lower the temperature of the gas to a temperature of 90° to 120° F. The cooled gas is passed into the water condensate knockout drum 3. Water condensate is drained from drum 3 through line 73. The gas from drum 3 is passed by line 4 to compressor 5 for compression to adequate pressure above 4000 p.s.i.g. and then is cooled to a temperature in the range of 90° to 120° F. in after-cooler 6. More compressors with intercoolers and water knockout drums may be used.

The cooled stream of fresh feed gas is mixed with recycle gas of similar pressure from line 26 at a gas mixing junction with line 7 to enter the oil seprator drum 8 or these streams are mixed on entering drum 8 from separate inlets. The recycle gas from line 26 is admixed in a suitable proportion and is at sufficiently low temperature, e.g., 70° to 90° F., for bringing about removal of oil and water condensate to be drained from separator 8 through line 9 without condensing $NH_3$. A suitable temperature of the mixed feed for this step is 90° to 100° F. at a pressure of 4400 to 4600 p.s.i.g.

The gas separated from oil and water condensate in drum 8 is passed by line 10 through cooler 11 and chiller 12 to be chilled to a low temperature, e.g., 30° F. at 4450 p.s.i.g.; then is passed into high-pressure separator 13 where the conditions are suitable for condensation of liquefied ammonia which scrubs out all but a few p.p.m. of water, CO, $CO_2$, and oil. Thus obtained condensate is fertilizer grade ammonia which is withdrawn from drum 13 through line 14 to be delivered by line 14 to a pressure letdown drum 15.

Where a gas stream is chilled or passed through a chiller, refrigeration is accomplished by vaporization of liquid ammonia circulated in the refrigeration circuit.

The purified gas from high-pressure separator 13 is passed by line 16 through a heat exchanger 17 for addition of heat so that the gas by going through line 18 into the converter 19 is at a suitable temperature, e.g., 80° F., and has a pressure of 4400 p.s.i.g. Portions of this gas are diverted through the valve controlled manifold lines 20 between the catalyst bed sections in the converter for improved temperature control. The major portion of feed gas is heated by heat exchange in the converter then passed down through the catalyst beds starting at 750° to 900° F.

Gas effluent product leaving the bottom catalyst bed in the converter 19 through line 21 is passed through coolers 22, 222, and chiller 23 into recycle gas separator 24, which is operated at 70° to 90° F. and 4000 to 4400 p.s.i.g. to cause 70 to 85% of the $NH_3$ synthesized per pass in the effluent gas to condense. This $NH_3$ condensate of high purity flows down through line 25 into the pressure letdown drum 15 or a separate drum, if desired, but is kept separated from the fertilizer grade $NH_3$.

The main stream of uncondensed gas leaving overhead from separator 24 through line 27 is the recycle gas which is passed by line 28 into the recycle-gas compressor 29. This recycle gas requires little added compression, e.g., 100 to 200 p.s.i., to be returned by line 26 into line 7 or drum 8 for mixing with fresh feed.

A portion of the overhead gas from separator 24 is passed by line 30 through a high-pressure chiller 31 into the high-pressure purge gas separator 32 which at 25° F. condenses out some of the ammonia. The ammonia condensate from the high-pressure purge gas separator 32 may be passed through line 33 to the letdown drum 15.

The purge gas containing impurities is removed from separator 32 through line 74 and may be passed to a burner for use as fuel.

The pressure letdown drum 15 serves to hold high-purity liquid ammonia at a lowered pressure, e.g. 300 to 350 p.s.i.g., and a partition 34 holds the less pure ammonia condensate at one end of the drum, this less pure $NH_3$ condensate having come from the knockout drum 13, as previously mentioned, by way of line 14.

Vapors from drum 15 pass up through line 35 through a chiller 36 into a low-pressure condensate separator 37. Vent gas containing impurities are removed from separator 37 through overhead line 38 to be sent to a burner as fuel. Ammonia condensate is returned from 37 to the drum 15 by line 39. The fertilizer grade liquid ammonia is dithdrawn from drum 15 through line 40 to be sent to a urea synthesis plant. This ammonia even though it contains some impurities may be above 99% pure $NH_3$.

The higher purity refrigeration-grade liquid ammonia is withdrawn from drum 15 by line 41 to the pressure refrigeration letdown drum 42 wherein some separation of ammonia vapor takes place, e.g., at 62° F. and 97 p.s.i.g. The $NH_3$ vapor is withdrawn from drum 42 through line 43 to be sent to a high-pressure stage compressor 44. Liquid ammonia is removed from drum 42 through line 45 and may be sent through line 46 to the storage tank 47. A portion of the liquid ammonia from drum 42 is passed by line 233 to chiller 23 and the resulting $NH_3$ vapors may be returned by line 234 to drum 42.

Tank 47 is provided with a vapor removal line 48 and with a liquid ammonia draw off line 49. A remaining part of the liquid ammonia withdrawn from drum 42 is passed by line 50 to the lower pressure or suction drum 51 where the ammonia is under lower pressure, e.g., 24 p.s.i.g. to obtain a low temperature of 10° F. Drum 51 is on the suction side of the low pressure stage compressor 52 through line 53. The vapors compressed in stage 52 are sent by line 54 to a higher pressure compressor stage 44 where the compressed vapors are mixed with vapors added by line 43 from the refrigeration letdown drum 42, and compressed vapors from the refrigeration compressors are sent by line 55 through heat exchangers, e.g., air fin cooler and water cooler 56, to lower the temperature of the compressed vapors and condense $NH_3$, then passed into the ammonia accumulator 57. The accumulator 57 has a vapor take off line 58 with a heat exchanger 59 therein connected to a condensate separator 75. The condensate separator 75 has a gas vent line 60 and a condensate return line 61. By providing a partition 62 in the accumulator drum 57, higher purity liquid ammonia is kept on one side of the separator to be returned by line 63 to the refrigeration letdown drum 42.

Ammonia from a urea plant may be passed into accumulator 57 by line 70 and fertilizer grade ammonia is withdrawn from the accumulator by line 71.

If the accumulator 57 is not used, the ammonia condensate from cooler 56 is passed into drum 15 on the side where refrigeration grade $NH_3$ is collected.

The low pressure suction drum 51 has a cold liquid ammonia line 64 for passing the cold liquid ammonia as refrigerant to the mentioned chillers, e.g., chiller 59 in the vapor line from accumulator 57, chiller 31 for the high-pressure purge separator 32, chiller 36 for chilling vapor from the letdown drum 15, and chiller 12 for chilling the mixed fresh feed-recycle gas passed to the high-pressure separator 13. The ammonia vapors formed by indirect heat exchange in the chillers are returned from these heat exchangers through line 65 to the drum 51 for recompression and cooling in the refrigeration loop.

It is to be understood that the flow diagram and explanation thereof does not include details as to a number of conventionally used engineering devices for causing the flow of liquids through lines necessary, flow meters, temperature measuring devices, pressure measuring devices, control valves both manual and automatic, and any additional heat exchange and pumping equipment needed or desired.

The converter 19 is shown in a simplified manner. For start up of the converter a fired start-up furnace 66 is used. The feed gas is sent through a coil 67 in furnace 66 to be heated up to a suitable temperature of about 750 to 900° F. and this hot gas is passed into the converter for activating the catalyst and bringing the catalyst up to the desired operating temperature. After start up, the heating coil 67 is not used. The amount of catalyst which is required in a commercial size converter amounts to many tons and, therefore, there have been problems associated with the conventional converter designs which require heavy duty lifting and rigging equipment to load the catalyst into the converter. There are other problems with regard to the internal fittings used in the conventional converters, e.g., baskets, supporting members, etc. It has been found feasible to employ in converter 19 a more simplified construction and arrangement of the beds of catalyst that eliminate to some extent the use of baskets or other complicated supporting devices. The improved method simply separates the catalyst beds by layers of alumina or refractory lumps or spheres, the lumps or spheres being larger than the catalyst particles. Other refractories and shapes may be used. These separating bodies of refractory solids act to distribute the gases passing from an upper bed to a lower bed and to mix the quench feed gas introduced between the beds adequately with the main stream of gaseous reactants and products flowing down through the converter catalyst beds. Using such separators, all that is required for unloading is to dump beds and the alumina separators entirely down through the bottom of the converter after removing the base closure of the converter. The catalyst chamber then need have only a bottom layer of refractory solids or a removable perforated plate or grating to support the catalyst beds with the intermediate layers of the alumina or refractory solids. For loading the converter, first a layer of the refractory spheres or lumps is formed above the grating or perforated plate by being added by dumping to the open top of the converter, the head of the converter having been removed. Then a bed of enough catalyst is dropped down on the layer of the lumps or spheres to form the bottom catalyst bed and successively the other layers of refractory spheres or lumps and catalytic particles are dropped into place through the top of the converter.

Important process control factors in the recycle loop arangement, which includes the recycle gas separator 24 and the recycle compression equipment 29, are concisely outlined as follows:

The converter effluent product contains $NH_3$ and unconverted synthesis gas in proportions depending upon operating conditions of the ammonia synthesis reaction. This gas is chilled in chiller 23 and kept under sufficient pressure so that most of the $NH_3$ synthesized is condensed and separated, e.g., 70 to 85% at 80° F. and 4300 p.s.i.g.; and the separated recycle gas leaving separator 24 then contains $H_2$ and $N_2$ in approximately a 3/1 mole ratio, 15 to 16% inerts, 8 to 9% $NH_3$. A small portion of this recycle gas stream is withdrawn for high-pressure purging in separator 32 and this gives an added close control of the recycle gas stream passed on to the compression equipment 29.

The ratio of recycle synthesis gas pumped through line 26 mixed with the compressed fresh synthesis gas is adequately high (in the region of 3.3/1.0) to maintain a sufficiently high space velocity through the converter so as to avoid overheating damage to the catalyst therein.

The recycle compression equipment must be made reliable and warrants the use of standby compression equipment. This compression equipment should have flexibility in capacity to control the proportion of recycle gas and thereby control the proportion of inert gas components in the mixed fresh feed-recycle feed stream transported to the converter, because the proportion of inert components is also a factor in adjusting the space velocity and conditions of reaction in the converter necessary to avoid damage to the catalyst and obtain a controlled overall operation. The fresh synthesis gas introduces into said mixture a relatively small amount of inert components.

In the preferred operation, the mixed gas feed going to the converter is closely controlled in composition to contain in the range of 10 to 15% of inert gas components and 2 to 4% $NH_3$. In the preferred or base example, the mixed gas feed to the converter is made to contain 12.5% inerts.

Check valves may be provided in the discharge lines 26 and 7 to prevent back flow in these lines.

Hydrocarbon lubricating oil used in the compressors 5 and 29 should be carefully selected to contain minimum amounts of substances which act as catalyst poisons and the oil itself poisons the synthesis catalyst. The oil separator 8 receives the fresh feed and recycle streams to knock out oil which is removed by draining. Demister devices for removing entrained droplets are used in the drum. The recycle gas at a substantially lower temperature, e.g., 80° to 90° F., and in the higher proportion gives the mixed gas stream a temperature of 90° to 100° F. in the oil separator where oil is dropped out to have less than 5 p.p.m. of the oil in the gas.

The mixed gas feed leaving the oil separator 8 is further cooled in the heat exchange cooler 11 and chiller 12, the coolant used in chiller 12 being liquid ammonia from the refrigeration circuit in order to lower the temperature of the mixed gas sufficiently, e.g., to 30° F., to condense out enough of the ammonia carried by the mixed gas into the high pressure separator 13 so that the mixed gas then contains 2 to 4% gaseous $NH_3$. In the preferred example 15 to 30% of the amomnia synthesized is condensed and removed in this zone. The ammonia condensate in this quantity dissolves and washes down water vapor, carbon oxides and oil carryover, the liquid ammonia being a good solvent. The temperature and pressure conditions in the high-pressure separator 13 are controlled, taking into account the refrigeration requirement and the subsequent preheating requirements.

The gas forwarded overhead from the high-pressure separator 13 through line 16 into the heat exchanger 17 contains remaining uncondensed ammonia which is between 2 and 4% of the total mixed feed, which contains 10 to 15% inerts.

The mixed feed gas is heated in the heat exchanger 17 to 80° F. or close thereto before being supplied both as the main stream feed through line 18 and as multiple quench streams through manifold lines 20. The main stream of the mixed feed is made to flow through line 18 into the converter. The quench streams flow through the manifold lines 20 to provide more accurate temperature control and minimize hot spots.

The following example is illustrative of the ammonia converter operations:

EXAMPLE

Using as a converter a four-catalyst bed quench type reactor operating at an inlet pressure of 4500 p.s.i.g. with 12.5% inerts and 3% $NH_3$ in the mixed feed gas (fresh feed mixed with recycle gas), a maximum allowable catalyst temperature for the adiabatic exothermic operation is determined for the catalyst used, e.g., 975° or 1000° F., and at the same time a minimum inlet temperature of the feed gas to the first catalyst bed is determined, e.g., 800° F. The fourth or last bed outlet temperature is then determined to be below the maximum allowable, e.g., no more than 100° to 200° F. higher than the inlet temperature.

The ammonia synthesis reaction is run at a moderate conversion per pass so that the effluent contains, for example, 16.4% ammonia, this effluent being passed from the converter through a cooler and chiller to the recycle gas separator, where the recycle loop may be regarded as starting. In the chiller, the coolant is ammonia refrigerant which may come from drum 42 through line 233 and be returned to the drum via line 234.

Control of conditions in the recycle gas separator 24 is important for adjusting the composition of the recycle gas while keeping the recycle gas at a high pressure to save compression energy. In separator 24, a temperature of 80° F. is suitable when the pressure is 4300 p.s.i.g.

The high-pressure purge gas separation used in conjunction with the recycle gas separator 24 gives the advantages of fine control of the recycle gas flow rate in the recycle loop by permitting a bleed stream draw off through the chiller 31 into the high-pressure purge separator 32 where the conditions are such, e.g., a pressure of about 4250 p.s.i.g. and a temperature of 25° F., for recovering most of the ammonia by condensation while expelling a high-pressure purge gas containing inerts with some synthesis gas through line 34. The lower temperature for this high pressure purge is obtained in chiller 31 using ammonia refrigerant from line 64 of the refrigeration cycle. This method of purging inerts from the recycle gas works remarkably well considering that more than two-thirds of the inerts to be continuously removed are expelled in the high-pressure purge stream with a loss of less than 10% of reactant gas based on fresh feed.

Using the operations disclosed and shown in the drawing for keeping the high-purity refrigeration grade ammonia separated from the fertilizer grade ammonia and operating in accordance with the example set forth, the total recovery of ammonia synthesized is over 98%, 70 to 85% being of the high-purity refrigeration grade containing only trace amounts of impurities and 15 to 30% of the ammonia product being suitable as fertilizer grade, such as can be used without further purification to make urea.

A further recovery of ammonia from the purge gases may be obtained if desired by use of a selective adsorbent or absorbent for ammonia.

The operations which have been described are suitable even when the cooling water available has temperatures as high as 93° F.

The invention described is claimed as follows:

1. In a continuous ammonia synthesis process wherein a mixed feed of fresh ammonia synthesis gas and ammonia-containing recycle synthesis gas which contains unconverted hydrogen and nitrogen therein is transported to an ammonia synthesis conversion zone, the improvement which comprises condensing 15% to 30% of the total ammonia synthesized to remove the catalyst poisoning impurities comprising water, carbon oxides, and hydrocarbon oil from the mixed feed thereby leaving about 2% to about 4% ammonia in the feed; effecting the ammonia synthesis reaction in a conversion zone under a pressure or between about 4000 to about 5000 p.s.i.g.; condensing the remaining 70% to 85% of the synthesized ammonia for use as a refrigerant in a refrigeration cycle; separating from the recycle gas a purge stream for controlling inert material comprising methane, argon, and helium at a level of 10% to 15%; compressing the remaining recycle gas and mixing it with said fresh synthesis gas in a ratio of from about 3/1 to 3.5/1 to form a mixed feed containing hydrogen and nitrogen in the ratio of about 3 moles of hydrogen to about 1 mole of nitrogen.

2. A process according to claim 1, wherein said mixed feed prior to its introduction into said conversion zone contains about 10% to about 15% of inert gas and about 2% to about 4% ammonia.

3. A process according to claim 1, wherein said conversion zone contains a series of beds of catalyst particles, said catalyst beds being cooled by injected portions of the mixed feed and by indirect heat exchange with a major portion of the mixed feed as it is being heated to the desired initial conversion temperature required on passing into a first catalyst bed, said catalyst beds having temperatures in the range of about 800° to about 1000° F.

4. A process according to claim 1, wherein the mixed feed is maintained under a pressure of about 4400 to about 4600 p.s.i.g. and at a temperature of about 90° to 100° F. to separate hydrocarbon oil and water without condensing ammonia before the mixed feed is further chilled to condense ammonia which carries away in solution said catalyst-poisoning impurities.

References Cited
UNITED STATES PATENTS

| | | | |
|---|---|---|---|
| Re. 19,243 | 4/1925 | Richardson | 23—199 |
| 1,679,792 | 1/1926 | Slade et al. | 23—199 |
| 2,610,106 | 1/1950 | Gray | 23—199 |

EARL C. THOMAS, *Primary Examiner.*

OSCAR R. VERTIZ, *Examiner.*

H. S. MILLER, *Assistant Examiner.*